United States Patent
Kuramitsu et al.

(10) Patent No.: US 12,431,832 B2
(45) Date of Patent: Sep. 30, 2025

(54) MOTOR CONTROL DEVICE, MOTOR DRIVE DEVICE, MOTOR SYSTEM, AND ELECTRICAL APPARATUS

(71) Applicant: ROHM CO., LTD., Kyoto (JP)

(72) Inventors: Yusuke Kuramitsu, Kyoto (JP); Motoya Kumagai, Kyoto (JP); Yasunobu Inoue, Kyoto (JP); Akira Hashimoto, Kyoto (JP); Shigeru Hirata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 163 days.

(21) Appl. No.: 18/499,731

(22) Filed: Nov. 1, 2023

(65) Prior Publication Data
US 2024/0171110 A1    May 23, 2024

(30) Foreign Application Priority Data
Nov. 18, 2022 (JP) .................. 2022-184539

(51) Int. Cl.
*H02K 7/18* (2006.01)
*F25B 49/02* (2006.01)
*H02P 27/08* (2006.01)

(52) U.S. Cl.
CPC .......... *H02P 27/085* (2013.01); *F25B 49/025* (2013.01); *F25B 2600/021* (2013.01)

(58) Field of Classification Search
CPC .......... H02P 27/085; H02P 27/08; H02P 6/34; H02P 6/08
See application file for complete search history.

(56) References Cited

U.S. PATENT DOCUMENTS

| | | | |
|---|---|---|---|
| 2010/0097028 A1* | 4/2010 | Lin | H02P 27/045 318/808 |
| 2020/0162008 A1* | 5/2020 | Jung | H02P 27/12 |

FOREIGN PATENT DOCUMENTS

JP      2017184426      10/2017

* cited by examiner

*Primary Examiner* — Muhammad S Islam
(74) *Attorney, Agent, or Firm* — Fish & Richardson P.C.

(57) ABSTRACT

The present disclosure provides a motor control device that realizes a drive signal for each phase in a three-phase modulation control system with an analog circuit. The motor control device includes a generator, a modulation unit and inverting unit. The generator is configured to receive an input voltage and generate an analog voltage having a crest value corresponding to the input voltage and having a reference potential or higher. The modulation unit is configured to generate a PWM voltage based on the analog voltage output from the generation unit. The inverting unit is configured to invert a duty in a predetermined period of the PWM voltage.

10 Claims, 6 Drawing Sheets

MOTOR CONTROL DEVICE, MOTOR DRIVE DEVICE, MOTOR SYSTEM, AND ELECTRICAL APPARATUS

TECHNICAL FIELD

The present disclosure relates to a motor control device, a motor drive device, a motor system and an electrical device.

BACKGROUND

There are two-phase control means and three-phase control means (for example, refer to patent publication 1) available as control means for a three-phase brushless motor.

Figure 1:
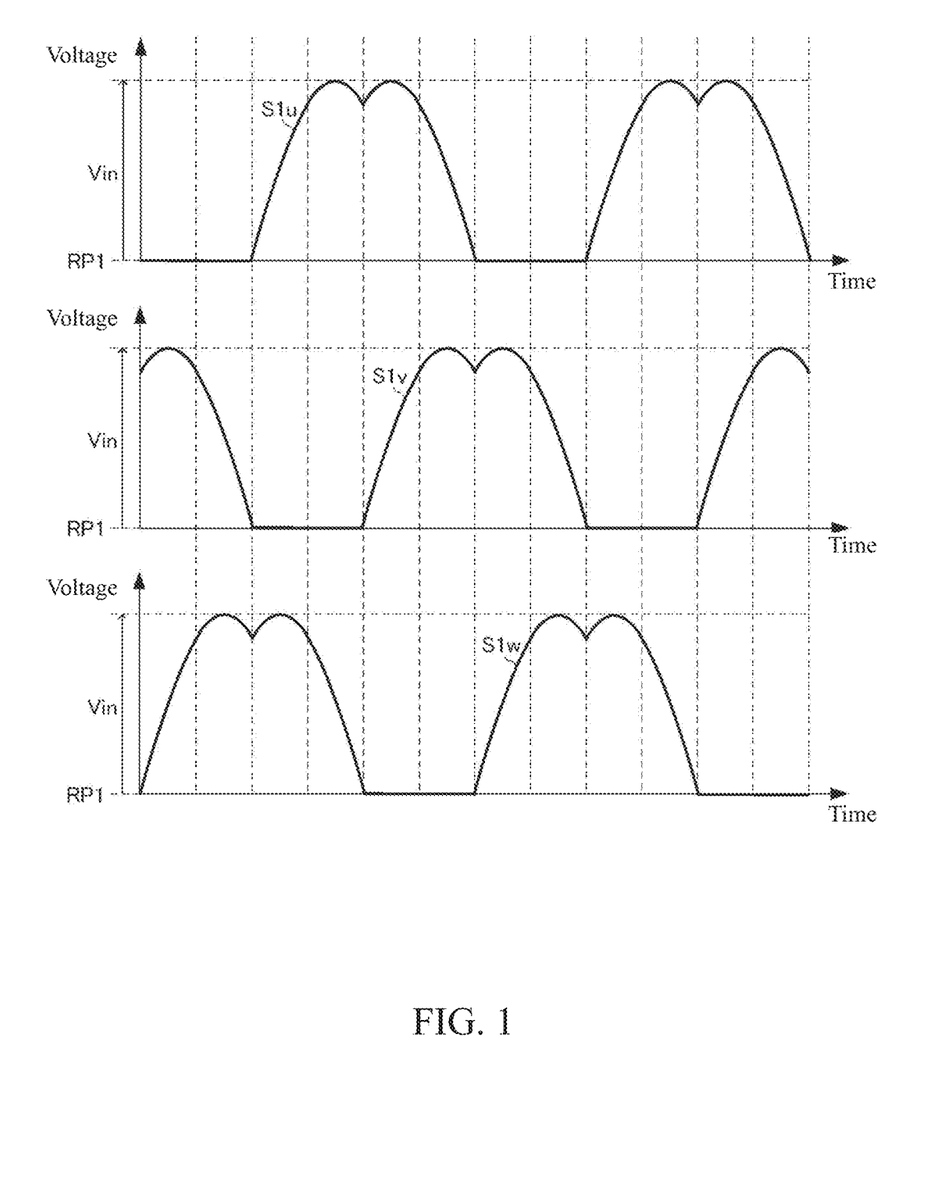
FIG. 1 is a diagram of drive signals of individual phases in a 2-phase control means.

The two-phase control means is a means that performs switching control on switching elements corresponding to two of three phases including U, V and W phases. In the two-phase control means, drive signals S1$u$, S1$v$ and S1$w$ of the phases shown in FIG. 1 are used. The drive signals S1$u$, S1$v$ and S1$w$ of the phases are signals having peak values corresponding to an input voltage Vin and having a potential equal to or greater than a first reference potential RP1 (for example, 0[V]).

Figure 2:
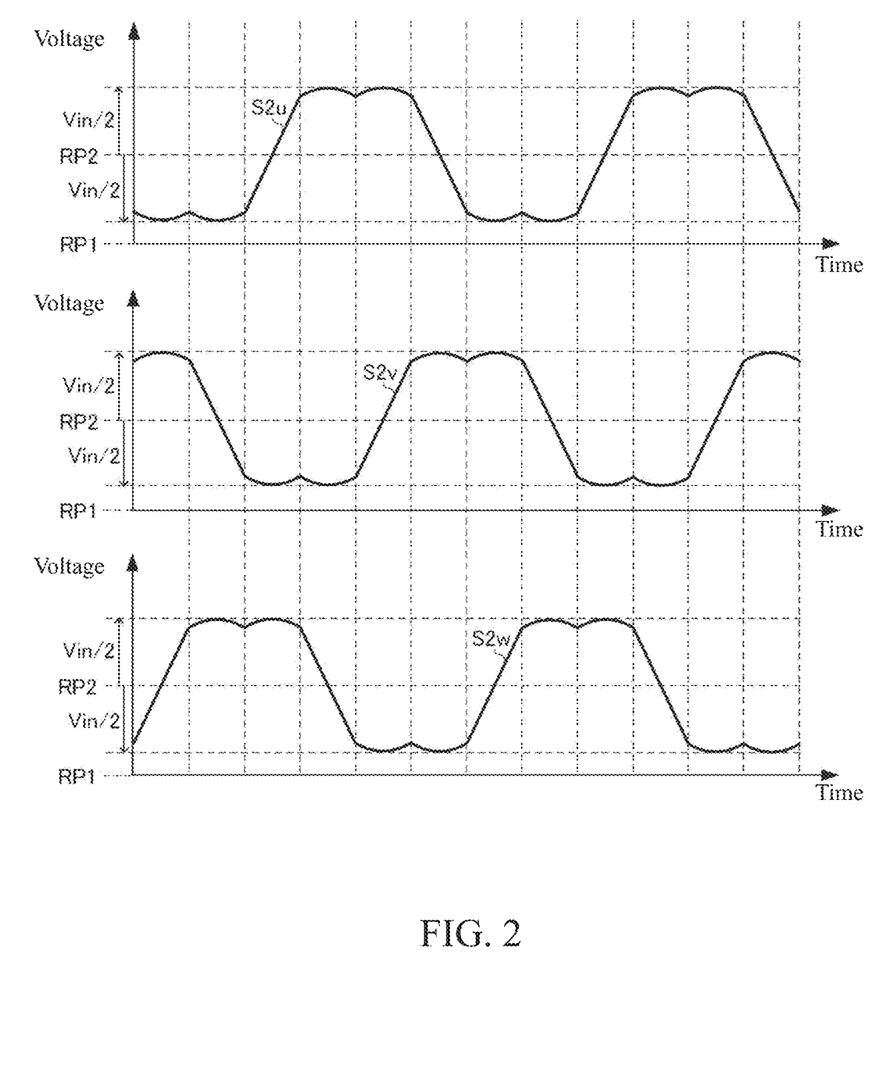
FIG. 2 is a diagram of drive signals of individual phases in a 3-phase control means.

The three-phase control means is a means that performs switching control on switching elements corresponding to all of three phases including U, V and W phases. In the three-phase control means, drive signals S2$u$, S2$v$ and S2$w$ of the phases shown in FIG. 2 are used. The drive signals S2$u$, S2$v$ and S2$w$ of the phases are periodically cyclic signals having peak values corresponding to an input voltage Vin and having a potential within a first interval equal to or greater than a second reference potential RP2 which is greater than the first reference potential RP1 and a second interval equal to or less than the second reference potential RP2.

PRIOR ART DOCUMENT

Patent Publication

[Patent document 1] Japan Patent Publication No. 2017-184426 (paragraph [0036])

DETAILED DESCRIPTION OF THE EMBODIMENTS

<Motor System>

Figure 3:
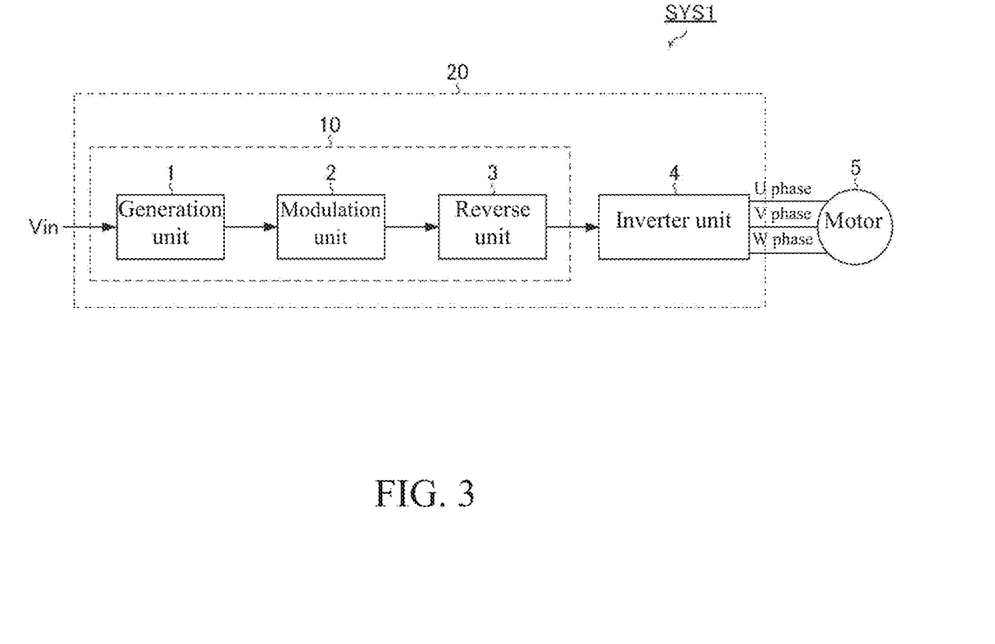
FIG. 3 is a diagram of a brief configuration of a motor system according to an embodiment.

FIG. 3 shows a diagram of a brief configuration of a motor system according to an embodiment. The motor system SYS1 shown in FIG. 3 includes a generation unit 1, a modulation unit 2, a reverse unit 3, an inverter unit 4 and a motor 5.

A motor control device 10 includes the generation unit 1, the modulation unit 2 and the reverse unit 3. The motor control device 10 performs switching control on the inverter unit 4. A motor drive device 20 includes the motor control device 10 and the inverter unit 4. The motor drive device 20 drives the motor 5.

The generation unit 1 receives an input voltage Vin. The input voltage Vin is a direct-current (DC) analog voltage. The input voltage Vin is supplied to the generation unit 1 from, for example, an external control device.

The generation unit 1 includes a two-phase modulation control mode and a three-phase modulation control mode. The generation unit 1 switches between the two-phase modulation control mode and the three-phase modulation control mode according to a rotational speed of the motor 5 or the input voltage Vin.

The generation unit 1, when operating in the two-phase modulation control mode, generates analog voltages A1$u$, A1$v$ and A1$w$ (refer to FIG. 4), which have peak values corresponding to the input voltage Vin and are equal to or greater than a first reference potential RP1 (for example, 0 [V]). In this embodiment, as an example, the peak values of the voltages A1$u$, A1$v$ and A1$w$ are equal to the input voltage Vin. The peak values of the analog voltages A1$u$, A1$v$ and A1$w$ can also be values obtained from performing operation processing on the input voltage Vin.

The generation unit 1, when operating in the three-phase modulation control mode, generates analog voltages A2$u$, A2$v$ and A2$w$ (refer to FIG. 5), which have peak values corresponding to the input voltage Vin and are equal to or greater than a second reference potential RP2 which is greater than the first reference potential RPL. In this embodiment, as an example, the peak values of the voltages A2$u$, A2$v$ and A2$w$ are equal to ½ of the input voltage Vin. The peak values of the voltages A2$u$, A2$v$ and A2$w$ can be equal to the input voltage Vin, or can also be values obtained from performing operation processing, other than multiplying by ½, on the input voltage Vin.

When the generation unit 1 operates in the two-phase modulation control mode, the modulation unit 2 generates pulse width modulation (PWM) voltages based on the analog voltages A1$u$, A1$v$ and A1$w$ output from the generation unit 1. More specifically, when the generation unit 1 operates in the two-phase modulation control mode, the modulation unit 2 generates a triangular wave voltage T1 (refer to FIG. 4).

Figure 4:
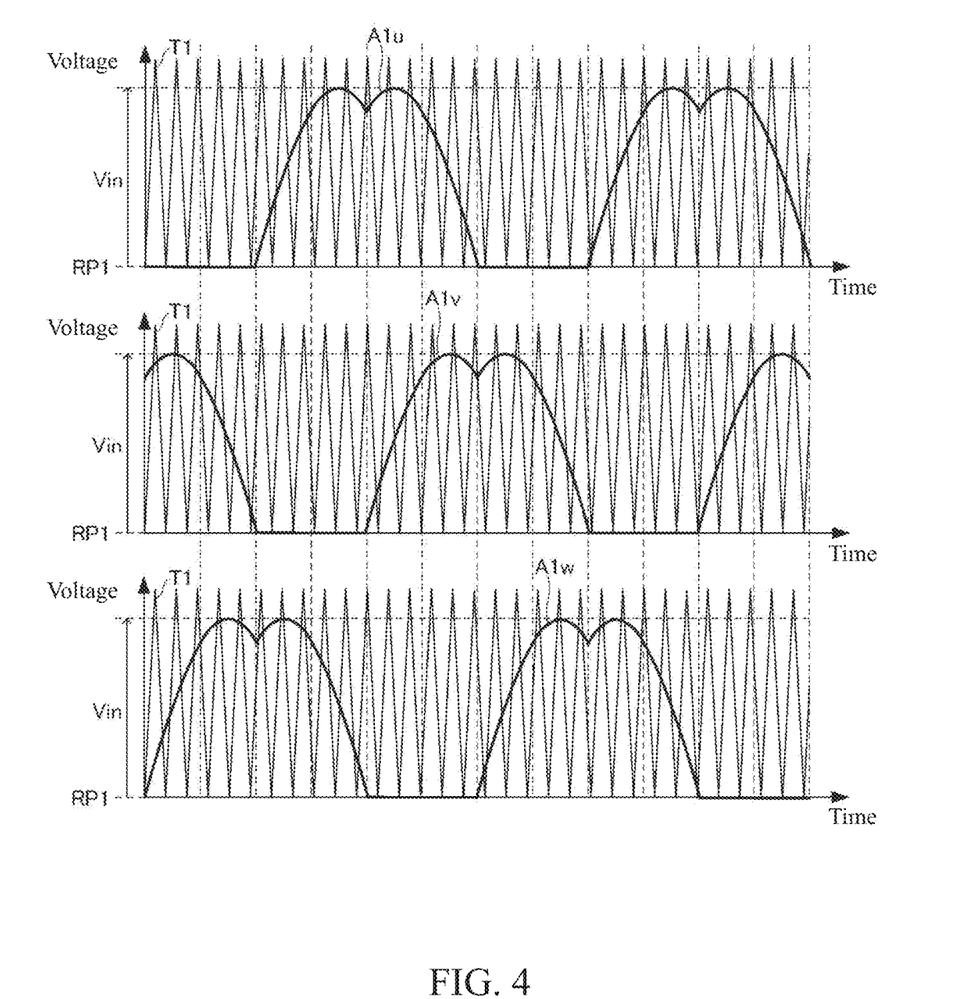
FIG. 4 is a wave diagram of an analog voltage generated by a generation unit and a triangular wave voltage generated by a modulation unit in a two-phase modulation control mode.

Moreover, the triangular wave voltage is a periodically cyclic voltage having an increasing interval that increases at a constant slope and a decreasing interval that decreases at a constant slope. An absolute value of the slope of the increasing interval and an absolute value of the decreasing interval can be the same or different. The triangular wave voltage can be a so-called sawtooth voltage, which has either the absolute value of the increasing interval or the absolute value of the decreasing interval being an infinite number.

Moreover, when the generation unit 1 operates in the two-phase modulation control mode, the modulation unit 2 compares the analog voltage A1$u$ and the triangular wave voltage T1 to generate a U-phase PWM voltage. When the analog voltage A1u is greater than the triangular wave voltage T1, the U-phase PWM voltage becomes high level (HIGH); when the analog voltage A1u is less than the triangular wave voltage T1, the U-phase PWM voltage becomes low level (LOW). Similarly, when the generation unit 1 operates in the two-phase modulation control mode, the modulation unit 2 compares the analog voltage A1v and the triangular wave voltage T1 to generate a V-phase PWM voltage. When the analog voltage A1v is greater than the triangular wave voltage T1, the V-phase PWM voltage becomes high level; when the analog voltage A1v is less than the triangular wave voltage T1, the V-phase PWM voltage becomes low level. Similarly, when the generation unit 1 operates in the two-phase modulation control mode, the modulation unit 2 compares the analog voltage A1w and the triangular wave voltage T1 to generate a W-phase PWM voltage. When the analog voltage A1w is greater than the triangular wave voltage T1, the W-phase PWM voltage becomes high level; when the analog voltage A1w is less than the triangular wave voltage T1, the W-phase PWM voltage becomes low level.

A minimum value of the triangular wave voltage T1 is equal to the first reference voltage RP1.

When the generation unit 1 operates in the three-phase modulation control mode, the modulation unit 2 generates PWM voltages based on the analog voltages A2u, A2v and A2w output from the generation unit 1. More specifically, when the generation unit 1 operates in the three-phase modulation control mode, the modulation unit 2 generates a triangular wave voltage T2 (referring to FIG. 5).

Figure 5:
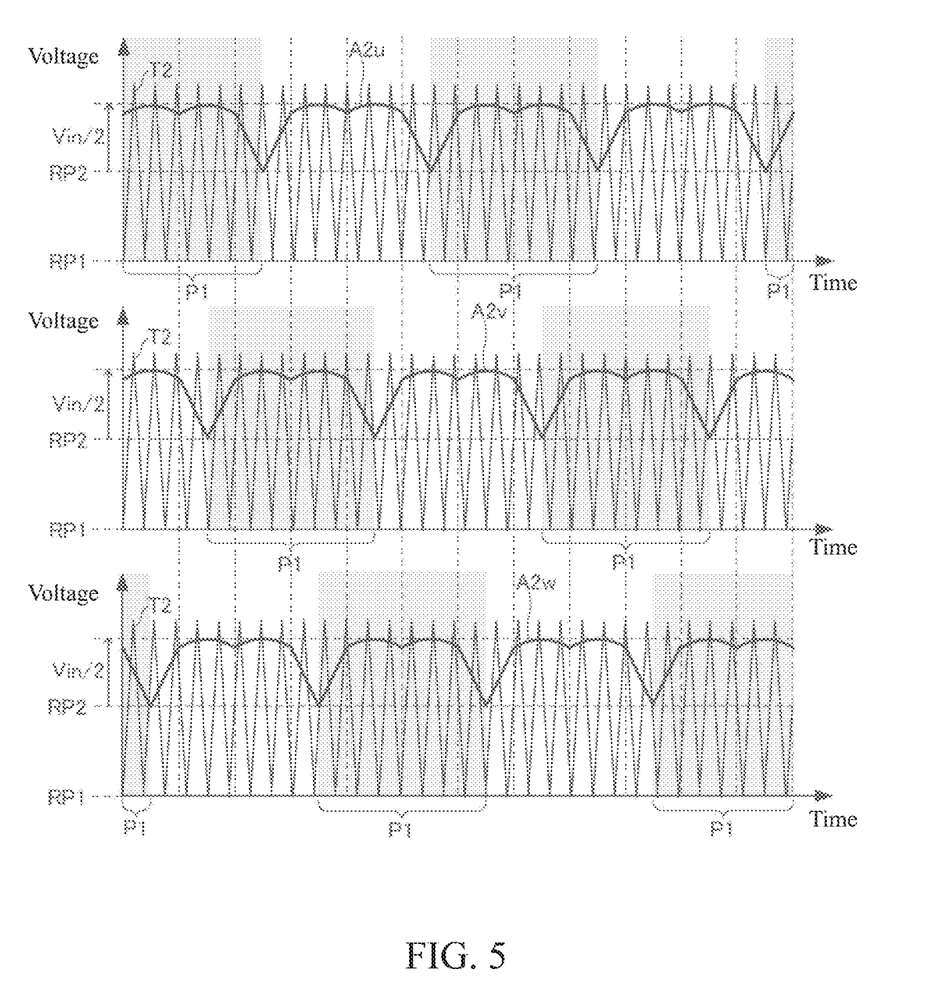
FIG. 5 is a wave diagram of an analog voltage generated by a generation unit and a triangular wave voltage generated by a modulation unit in a three-phase modulation control mode.

Moreover, when the generation unit 1 operates in the three-phase modulation control mode, the modulation unit 2 compares the analog voltage A2u and the triangular wave voltage T2 to generate a U-phase PWM voltage. When the analog voltage A2u is greater than the triangular wave voltage T2, the U-phase PWM voltage becomes high level; when the analog voltage A2u is less than the triangular wave voltage T2, the U-phase PWM voltage becomes low level. Similarly, when the generation unit 1 operates in the three-phase modulation control mode, the modulation unit 2 compares the analog voltage A2v and the triangular wave voltage T2 to generate a V-phase PWM voltage. When the analog voltage A2v is greater than the triangular wave voltage T2, the V-phase PWM voltage becomes high level; when the analog voltage A2v is less than the triangular wave voltage T2, the V-phase PWM voltage becomes low level. Similarly, when the generation unit 1 operates in the three-phase modulation control mode, the modulation unit 2 compares the analog voltage A2w and the triangular wave voltage T2 to generate a W-phase PWM voltage. When the analog voltage A2w is greater than the triangular wave voltage T2, the W-phase PWM voltage becomes high level; when the analog voltage A2w is less than the triangular wave voltage T2, the W-phase PWM voltage becomes low level.

A minimum value of the triangular wave voltage T2 is less than the second reference voltage RP2. That is to say, the second reference voltage RP2 is greater than the minimum value of the triangular wave voltage T2. More specifically, the second reference voltage RP2 is equal to a midpoint voltage of the triangular wave voltage T2. The midpoint voltage of the triangular wave voltage T2 is a value obtained by adding a maximum value and the minimum value of the triangular wave voltage T2 and dividing by two.

When the generation unit 1 operates in the two-phase modulation control mode, the reverse unit 3 is in a state where a reverse operation is stopped. Thus, when the generation unit 1 operates in the two-phase modulation control mode, the PWM voltages of the individual phases output from the modulation unit 2 pass through the reverse unit 3 and are supplied to the inverter unit 4, and the inverter unit 4 performs switching control on the PWM voltages of the individual phases output from the modulation unit 2.

When the generation unit 1 operates in the three-phase modulation control mode, the reverse unit 3 inverts a duty cycle of the PWM voltages of the individual phases output from the modulation unit 2 during a predetermined period P1 (refer to FIG. 5). The inverting of the duty cycle means swapping a high-level interval and a low-level interval of a PWM voltage. The inverting of the duty cycle can be easily implemented by a NOT gate of a logic circuit.

The inverter unit 4 sets the predetermined period P1 for the respective PWM voltages of the individual phases based on a rotor position of the motor 5. A method for detecting the position of the rotor can be any desired detection means such as detection using a Hall sensor, detection using a shunt current, or detection using a reverse voltage. Moreover, a shunt current can be a current of an individual phase, or can be a combined current of all the phases.

When the generation unit 1 operates in the two-phase modulation control mode, the inverter unit 4 performs switching control on the PWM voltages of the individual phases output from the modulation unit 2 to convert a DC voltage to a three-phase alternating-current (AC) voltage.

When the generation unit 1 operates in the three-phase modulation control mode, the inverter unit 4 performs switching control on the PWM voltages of the individual phases having undergone the inverting performed by the reverse unit 3, so as to convert the DC voltage to a three-phase alternating-current (AC) voltage.

The motor 5 is driven by the three-phase AC voltage output from the inverter unit 4. The motor 5 is a three-phase brushless motor, for example, an interior permanent magnet (IPM) motor.

The motor control device according to the configuration above is capable of easily realizing drive signals (the analog signals A2u, A2v and A2w) of the individual phases in the three-phase modulation control means by using an analog circuit.

Moreover, in the three-phase modulation control mode, the motor control device 10 according to the configuration above is capable of causing the respective peak values of the analog voltages A2u, A2v and A2w to change continuously relative to the change in the input voltage Vin. On the other hand, in the three-phase modulation control mode, in a situation where drive signals of the individual phases are generated by microcomputers and logic circuits as in the prior art, the respective peak values of the drive signals of the individual phases changes discretely relative to the change in the input voltage Vin. Thus, compared to the prior art, the motor control device 10 according to the configuration above provides outstanding control accuracy.

Moreover, in the motor control device 10 according to the configuration above, part of circuits for generating the respective drive signals (the analog voltages A1u, A1v, and A1w) for the individual phases in the two-phase modulation control mode and most part of circuits for generating the respective drive signals (analog voltages A2u, A2v and A2w) of the individual phases in the three-phase modulation control mode can be shared in the generation unit 1. Thus, miniaturization of a mounting surface of the motor control device 10 can be better achieved.

<Applicable Example of Motor System>

Figure 6:
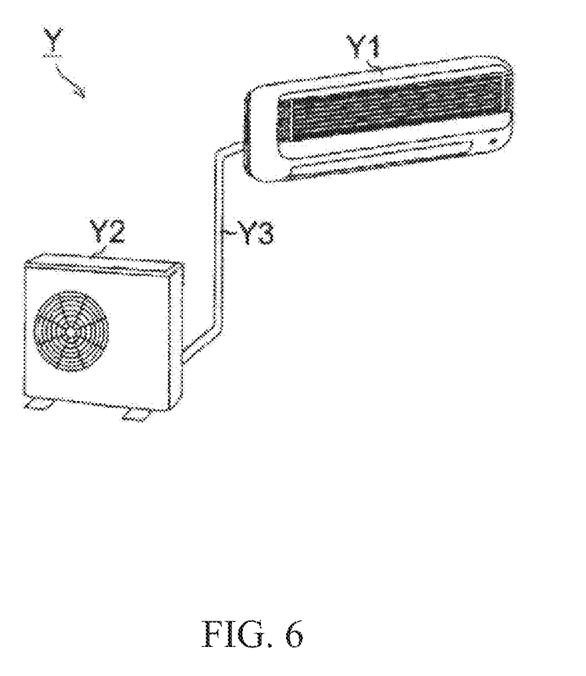
FIG. 6 is an appearance diagram of a configuration example of an air conditioner.

FIG. 6 shows an appearance diagram of a configuration example of an air conditioner. The air conditioner Y of the configuration example includes an indoor unit Y1, an outdoor unit Y2, and a pipe Y3 connecting the two units Y1 and Y2. Moreover, the indoor unit Y1 is primarily built-in with an evaporator and an indoor fan, and the outdoor unit Y2 is primarily built-in with a compressor, a condenser, an expansion valve and an outdoor fan.

The air conditioner Y of this configuration example includes, for example, two motor systems SYS1 as described above. One of the two motor systems SYS1 is used as a fan motor for rotating an impeller of the indoor fan, and the other of the two motor systems SYS1 is used as a fan motor for rotating an impeller of the outdoor fan.

During the cooling operation of air conditioner Y, first of all, after a refrigerant is compressed by the compressor of the outdoor unit Y2 and becomes a high-temperature and high-pressure gas, heat is radiated by the condenser of the outdoor unit Y2 and the refrigerant is liquefied. At this point, the outdoor fan is rotated to promote heat dissipation so that wind is blown to the condenser, and hot wind is blown out from the outdoor unit Y2. Next, the liquefied refrigerant is decompressed by the expansion valve of the outdoor unit Y2 and becomes a low-temperature and low-pressure liquid, and is transported to the indoor unit Y1 via the pipe Y3 and then evaporated by the evaporator of indoor unit Y1. At this point, a temperature of the evaporator becomes low due to the heat of vaporization of the refrigerant, so the indoor fan is rotated to blow air to the evaporator, and cold air is forwarded from the indoor unit Y1 to indoors. After the vaporized refrigerant is again transported to the outdoor unit Y2 via the pipe Y3, the same heat exchange process described above is repeated.

Moreover, during the heating operation of the air conditioner Y, a circulation direction of the refrigerant is reversed, and the functions of the evaporator of the indoor unit Y1 and the condenser of the outdoor unit Y2 are swapped, but basically the same heat exchange process described above is performed.

The motor system SYS1 can also be mounted in an electrical apparatus other than air conditioners. An electrical apparatus other than air conditioners can be, for example, a hot water supply pump, a dishwasher or a washing machine.

<Other>

Various modifications may be made to the embodiments of the disclosure within the scope of the technical concept of the claims. The various embodiments given in the description may be appropriately implemented in combination given that no contradictions are incurred. The embodiments above are only examples of possible implementations of the present disclosure, and the meanings of the terms of the present disclosure or the constituents are not limited to the meanings of the terms used in the embodiments above.

For example, the generation unit 1 of the motor system 1 is configured to have the two-phase modulation control mode and the three-phase modulation control mode; however, the generation unit 1 can also be configured to exclude the two-phase modulation control mode.

<Notes>

A note is attached to the disclosure to show specific configuration examples of the embodiments above.

A motor control device (10) of the present disclosure is configured as (a first configuration) comprising:

a generation unit (1), configured to receive an input voltage and generate an analog voltage having a peak value corresponding to the input voltage and equal to or greater than a reference potential;

a modulation unit (2), configured to generate a PWM voltage based on the analog voltage output from the generation unit; and a reverse unit (3), configured to invert a duty of the PWM voltage during a predetermined period.

The motor control device according to the first configuration can also be configured as follows (a second configuration): the modulation unit is configured to compare the analog voltage and a triangular wave voltage to generate the PWM voltage, and the reference potential is greater than a minimum value of the triangular wave voltage.

The motor control device according to the second configuration can also be configured as follows (a third configuration): the reference potential is equal to a midpoint potential of the triangular wave voltage.

The motor control device according to any one of the first to third configurations can also be configured as follows (a fourth configuration): the reverse unit is configured to set the predetermined period based on a rotor position of a motor.

The motor control device according to any one of the first to fourth configurations can also be configured as follows (a fifth configuration): the generation unit includes a two-phase modulation control mode and a three-phase modulation control mode.

The motor control device according to the fifth configuration can also be configured as follows (a sixth configuration): when the generation unit operates in the two-phase modulation control mode, the reverse unit is in a state where a reverse operation is stopped.

The motor control device according to the fifth or sixth configuration can also be configured as follows (a seventh configuration): the generation unit is configured to switch between the two-phase modulation control mode and the three-phase modulation control mode according to a rotational speed of a motor or the input voltage.

A motor drive device (20) of the present disclosure is configured (an eighth configuration) to comprise: an inverter unit (4), configured to convert DC voltage to AC voltage; and the motor control device of any one of the first to seventh configurations, configured to perform switching control on the inverter unit.

A motor system (SYS1) of the present disclosure is configured (a ninth configuration) to comprise:

a motor (5); and the motor drive device of the eighth configuration, configured to drive the motor.

The electrical apparatus (40) of the present disclosure is configured (a tenth configuration) to comprise the motor system of the ninth configuration.

The invention claimed is:

1. A motor control device, comprising:
    a generation unit, configured to receive an input voltage and generate an analog voltage having a peak value corresponding to the input voltage and equal to or greater than a reference potential;
    a modulation unit, configured to generate a PWM voltage based on the analog voltage output from the generation unit; and
    a reverse unit, configured to invert a duty of the PWM voltage during a predetermined period.

2. The motor control device of claim 1, wherein
    the modulation unit is configured to compare the analog voltage and a triangular wave voltage to generate the PWM voltage, and the reference potential is greater than a minimum value of the triangular wave voltage.

3. The motor control device of claim 2, wherein the reference potential is equal to a midpoint potential of the triangular wave voltage.

4. The motor control device of claim 1, wherein the reverse unit is configured to set the predetermined period based on a rotor position of a motor.

5. The motor control device of claim 1, wherein the generation unit includes a two-phase modulation control mode and a three-phase modulation control mode.

6. The motor control device of claim 5, wherein when the generation unit operates in the two-phase modulation control mode, the reverse unit is in a state where a reverse operation is stopped.

7. The motor control device of claim 5, wherein the generation unit is configured to switch between the two-phase modulation control mode and the three-phase modulation control mode according to a rotational speed of a motor or the input voltage.

8. A motor drive device, comprising:
   an inverter unit, configured to convert DC voltage to AC voltage; and
   the motor control device of claim 1, configured to perform switching control on the inverter unit.

9. A motor system, comprising:
   a motor; and
   the motor drive device of claim 8, configured to drive the motor.

10. An electrical device comprising the motor system of claim 9.

* * * * *